Patented July 3, 1923.

1,460,830

UNITED STATES PATENT OFFICE.

HERMAN G. C. THOFEHRN, OF ROSELLE PARK, NEW JERSEY; DONALD H. McLEAN ADMINISTRATOR OF SAID HERMAN G. C. THOFEHRN, DECEASED.

METALLURGICAL PROCESS.

No Drawing.   Application filed October 4, 1918. Serial No. 256,868.

*To all whom it may concern:*

Be it known that I, HERMAN G. C. THOFEHRN, a citizen of the United States, and a resident of Roselle Park, in the county of Union and State of New Jersey, have invented certain new and useful Improvements in Metallurgical Processes; and I do hereby declare the following to be a full, clear, and exact description of the invention, such as will enable others skilled in the art to which it appertains to make and use the same.

This invention relates to improvements in metallurgical processes and more particularly to processes of scavenging and refining metals, such as steel, copper and numerous alloys.

Experience has demonstrated that the use of aluminum alone and magnesium alone is not satisfactory in processes of refining and scavenging metals. The use of aluminum alone in steel scavenging, for instance, is too slow and sometimes even detrimental to the quality of the steel, on account of oxide of aluminum being dissolved in the mass of the molten metal. The use of magnesium alone is not satisfactory in most cases because the reaction of this metal with steel or copper and other metals is too rapid to permit thorough and uniform treatment throughout the whole mass of molten metal, and furthermore, such use of magnesium is dangerous in most cases on account of the liability of explosions.

The object of my present invention is to obviate the objections incident to the separate use of aluminum or magnesium, and to provide a process which can be kept well in hand to control the operation of scavenging at will and precisely to the extent called for in the different needs of different metals.

With this and other objects in view, the invention consists in the process of refining and scavenging metal, as hereinafter described and pointed out in the claims.

In carrying my improved process into effect, I deposit in the molten metal to be treated, a combination of aluminum and magnesium in the form of an alloy. This alloy may be made by first melting the aluminum and then adding magnesium in the proper proportion according to the particular metal to be treated. Other metals like uranium and vanadium may be added while melting the aluminum. The proportion of magnesium to aluminum necessarily varies in wide proportions from fifty per cent down to five per cent Mg and less,—depending upon the time required to bring about the desired reactions to effect the absorption of the gases which are dissolved or contained in the molten metal to be treated.

For the treatment of steel in the open hearth furnace, fifteen per cent magnesium to eighty-five per cent aluminum appear to be the most convenient proportions. However, if large proportions of gases, such as of sulfur or phosphorus or other gases or unalloyed metallic vapors are present, higher proportions of magnesium, even up to and higher than fifty per cent may be called for.

The alloy of Mg and Al used should be made of the highest quality of metals, as any impurity may impair the quality of the metal to be treated,—be it steel or copper or their alloys. The same precaution should be observed if the magnesium-aluminum alloy is to be used as a carrier for other metals such as uranium or vanadium to be incorporated into the mass of metal to be treated, in addition to its use for scavenging purposes.

In the treatment of steel for refining and scavenging the same, I may throw ingots of the magnesium-aluminum alloy in the receiving ladle while the metal is pouring into it. While the ladle is filling, the reactions take place and no time need be allowed after the ladle is full to complete them. In the case of copper, I prefer to throw the alloy ingots in the furnace, a very short time before the furnace is ready to be tapped and stir gently the whole molten mass to insure a good distribution of the alloy through the whole body of the bath. In the case of crucible work on steel as well as on copper or other metal, the alloy will be added to the molten mass and well stirred when about ready to be cast into the molds.

The quantities of the alloy to be used are very small; generally 0.01 to 0.005 per cent in weight of the metal to be treated are sufficient, unless it is desired to have part of the alloy remain in metallic form in the body of the treated metal in order to modify the quality or texture of it.

While aluminum alone has a tendency to infect the metal treated by its own oxide produced, analysis shows that in using both aluminum and magnesium combined, no such inconvenience is found.

Incidentally, the use of the Mg—Al alloy in various proportions of its components, permits me to introduce, by the use of the well known alumino theory, various quantities of metals such as vanadium, uranium, and other metals which may be of high utility to the metal which is under treatment.

Having fully described my invention what I claim as new and desire to secure by Letters-Patent, is:—

1. A metal scavening process consisting in introducing in the molten metal to be treated, during the pouring of the molten metal into the ladle, an alloy of aluminum and magnesium in the proportions to said molten metal substantially as specified.

2. The herein described process consisting in introducing in a molten mass of metal to be treated, during the pouring of the molten metal into the ladle, an alloy of aluminum and magnesium in such proportions to said molten mass of metal as to effect scavenging of the same.

3. The herein described process consisting in making an alloy of aluminum and magnesium within the proportions substantially as specified, and depositing ingots of such alloy in a molten mass of metal to be treated during the pouring of the molten mass of metal into the ladle, the said alloy being within the proportions to the mass of molten metal substantially as specified.

4. The herein described method of treating metal consisting in making an alloy of aluminum and magnesium, also incorporating into said alloy a rare metal, and depositing ingots of said alloy in a molten mass of metal to be treated, during the pouring of the molten metal into a ladle, said alloy being in such proportions to the molten mass as to effect scavening of the latter.

In testimony whereof, I have signed this specification in the presence of two subscribing witnesses.

HERMAN G. C. THOFEHRN.

Witnesses:
CALVIN VOS,
DONALD H. MCLEAN.